(12) United States Patent
Kimiduka et al.

(10) Patent No.: US 11,046,864 B2
(45) Date of Patent: Jun. 29, 2021

(54) COPOLYESTER RESIN AND POLYESTER FILM FOR COVERING METAL PLATES AND LAMINATED POLYESTER FILM COMPRISING SAME MADE INTO FILM

(71) Applicants: DAIWA CAN COMPANY, Tokyo (JP); Bell Polyester Products, Inc., Yamaguchi (JP)

(72) Inventors: Takashi Kimiduka, Yamaguchi (JP); Yuji Takeuchi, Yamaguchi (JP); Junji Matsumura, Kanagawa (JP); Masaya Okimoto, Yamaguchi (JP); Keita Katsuma, Yamaguchi (JP); Hideaki Tomura, Yamaguchi (JP); Sadamu Nakatsuka, Yamaguchi (JP)

(73) Assignees: DAIWA CAN COMPANY, Tokyo (JP); Bell Polyester Products, Inc., Yamaguchi (JP)

(*) Notice: Subject to any disclaimer, the term of this patent is extended or adjusted under 35 U.S.C. 154(b) by 927 days.

(21) Appl. No.: 14/902,609

(22) PCT Filed: Jul. 5, 2013

(86) PCT No.: PCT/JP2013/068555
§ 371 (c)(1),
(2) Date: Jan. 4, 2016

(87) PCT Pub. No.: WO2015/001679
PCT Pub. Date: Jan. 8, 2015

(65) Prior Publication Data
US 2016/0186005 A1    Jun. 30, 2016

(51) Int. Cl.
| | |
|---|---|
| *C08G 63/183* | (2006.01) |
| *C09D 167/02* | (2006.01) |
| *B65D 1/12* | (2006.01) |
| *B65D 25/14* | (2006.01) |
| *B65D 25/34* | (2006.01) |
| *B32B 27/36* | (2006.01) |
| *B32B 15/09* | (2006.01) |
| *C08G 63/199* | (2006.01) |
| *C09D 167/08* | (2006.01) |
| *C08G 63/78* | (2006.01) |

(52) U.S. Cl.
CPC ............ *C09D 167/02* (2013.01); *B32B 15/09* (2013.01); *B32B 27/36* (2013.01); *B65D 1/12* (2013.01); *B65D 25/14* (2013.01); *B65D 25/34* (2013.01); *C08G 63/183* (2013.01); *C08G 63/199* (2013.01); *C08G 63/78* (2013.01); *C09D 167/08* (2013.01); *B32B 2307/558* (2013.01); *B32B 2439/66* (2013.01)

(58) Field of Classification Search
CPC .... C09D 167/00; C09D 167/08; C08G 63/78; C08G 63/48; C08G 63/183; B32B 15/09; B32B 27/36; C08L 67/08

USPC ..... 525/167, 168, 444; 524/167, 167.5, 168; 528/295.3
See application file for complete search history.

(56) References Cited

U.S. PATENT DOCUMENTS

| | | | | |
|---|---|---|---|---|
| 2004/0198907 | A1* | 10/2004 | Ohishi | ................... B32B 15/08 525/64 |
| 2010/0021749 | A1 | 1/2010 | Funagi et al. | |

FOREIGN PATENT DOCUMENTS

| | | | | |
|---|---|---|---|---|
| CN | 101646712 | | 2/2010 | |
| CN | 102516517 | * | 6/2012 | ........... C08G 63/183 |
| EP | 1344643 A1 | * | 9/2003 | ............. B32B 15/08 |
| JP | 81863 | | 1/1996 | |
| JP | 2001347621 A2 | | 12/2001 | |
| JP | 3262187 A2 | | 3/2002 | |
| JP | 3303999 B2 | | 7/2002 | |
| JP | 3304000 B2 | | 7/2002 | |
| JP | 3304003 B2 | | 7/2002 | |
| JP | 200560645 | | 3/2005 | |
| JP | 2006199915 A2 | | 8/2006 | |
| JP | 2013147547 A2 | | 8/2013 | |

(Continued)

OTHER PUBLICATIONS

International Search Report dated Nov. 12, 2013 filed in PCT/JP2013/068555.

(Continued)

*Primary Examiner* — Lee E Sanderson
*Assistant Examiner* — Michael C Romanowski
(74) *Attorney, Agent, or Firm* — Rankin, Hill & Clark LLP

(57) ABSTRACT

The problem to be solved by the present invention is to provide a polyester resin excellent in various properties wherein the film formability is good, film fracture (hairs) and scraping (galling) are not easily generated in the drawing/ironing process when applied to a metal-sheet-coating polyester film, the film surface is not damaged when used as the inner-surface film for a metallic can, and the metallic can is hardly corroded (dent resistance), by dropping or external impact (denting), after a product is made by enclosing contents into the can.

The copolyester resin of the present invention is characterized by comprising, as the constituent units, 50 to 93 mass % of (A) ester oligomer with the number-average molecular weight of 700 or lower and consisting of a dicarboxylic acid unit (a1) containing 70 mole % or more of the terephthalic acid component and a diol unit (a2) containing 70 mole % or more of the ethylene glycol component; and 7 to 50 mass % of (B) polyester polyol with the number-average molecular weight of 1500 to 3000 and consisting of a hydrogenated dimer acid unit (b1) and a 1,4-butanediol unit (b2).

1 Claim, No Drawings

(56) References Cited

FOREIGN PATENT DOCUMENTS

| JP | 2013188946 | A2 | 9/2013 | | |
|----|------------|----|--------|---|---|
| KR | 20080051403 | * | 6/2008 | ........... | C08G 63/181 |
| KR | 20080051403 | A | 6/2008 | | |

OTHER PUBLICATIONS

Extended European Search Report dated Jan. 30, 2017 issued in the corresponding European patent application No. 13888760.9.

* cited by examiner

COPOLYESTER RESIN AND POLYESTER FILM FOR COVERING METAL PLATES AND LAMINATED POLYESTER FILM COMPRISING SAME MADE INTO FILM

TECHNICAL FIELD

The present invention relates to a copolyester resin and a metal-sheet-coating polyester film and a laminated polyester film formed by film-forming the same, and in particular, relates to a copolyester resin suitable for a metal-sheet-coating polyester film used for the corrosion prevention of metallic cans and excellent in flexibility and impact resistance.

BACKGROUND ART

In the past, paint was applied on the inner and outer surfaces of a metallic can to prevent corrosion. Because of the harmfulness to the human body, detrimental effects on the environment, and the low productivity due to long drying time, the lamination of polyester film, by beat and pressure, on the metal sheet such as steel, tin, or aluminum and the subsequent manufacturing of cans have been investigated. On the other hand, for beverage cans, there are the so-called three-piece can, wherein a cylinder is formed by cylindrically rolling and welding a metal sheet and a lid is attached to the top and bottom openings, and the so-called two-piece can, wherein a container is formed by drawing and ironing a metal sheet and a lid body is wound and tightened on the top opening.

Here, there have been the following problems. When the production of a two-piece can is attempted by using a metal sheet laminated with polyester film, the peeling (delamination) of the film takes place because of a lack of adhesion to the metal sheet. When used as the outer surface film of a metallic can, film fracture (hairs) and scraping (galling) take place in the drawing/ironing process. When used as the inner-surface film for a metallic can, the film surface is damaged and the metallic can is corroded, by dropping or external impact (denting), after a product is made by enclosing contents into the can. Furthermore, in the molding process of a two-piece can, the crystallization of laminated polyester film is facilitated by the heating process, such as the evaporation of lubricant or the drying of printing ink, and the film becomes brittle; therefore, it is necessary to maintain an amorphous state by rapid cooling after the drying process; thus there has been a problem in that the process is complicated and the efficiency is poor.

In order to solve these problems, for example, the blending of polytetramethylene terephthalate-polytetramethylene oxide block copolyester (PBT-PTMG) and polyethylene wax, as the flexible components, into the polyester resin has been proposed (refer to Patent Literature 1). In the film wherein this resin composition is used, the issues of delamination, hairs, and galling can be improved; however, film cracks are generated by the denting after the inclusion of contents. In the application for carbonated beverages and sports drinks, there is a problem in that the corrosion of metallic cans takes place easily. Furthermore, the crystallization rate of PBT-PTMG resin is fast, and the crystallization is promoted by heat in the molding process. Therefore, the quenching after heating and drying is essential to maintain an amorphous state. Thus, dedicated cooling facilities are necessary; as a result, there is also a problem in that the process is complicated and the efficiency is poor.

For the polyester resin, a copolyester resin containing a specific amount of a dimer acid of 36 carbon atoms, as the flexible component, has been proposed (refer to Patent Literatures 2 to 4). When the film with this resin composition is used, hairs and galling can be improved; however, the dent resistance due to external impact is still insufficient, and it is not satisfactory as the resin film for the protection of the inner and outer surfaces of metallic cans.

On the other hand, a block copolymer obtained by copolymerizing an aromatic polyester and an aliphatic polyester consisting of a dimer acid and butanediol has been proposed as the polyester elastomer (refer to Patent Literature 5). However, when this resin composition is used, the obtained copolymer has a block structure wherein there is a separation of hard segments and soft segments because a high-molecular weight aromatic polyester with the number-average molecular weight of 5000 to 30000 is used as the hard segment; as a result, the appearance is cloudy. When the formation of a sheet or film is attempted by mixing this copolymer and other polyester resins, a surging phenomenon (discharge instability phenomenon) takes place during melt extrusion because of their poor compatibility; thus there is a problem in that a sheet or film cannot be formed.

RELATED ART DOCUMENTS

Patent Literatures

[Patent Literature 1] Japanese Unexamined Patent Publication No. 2006-199915
[Patent Literature 2] Japanese Patent Publication No. 3303999
[Patent Literature 3] Japanese Patent Publication No. 3304000
[Patent Literature 4] Japanese Patent Publication No. 3304003
[Patent Literature 5] Japanese Unexamined Patent Publication No. 2005-60645

DISCLOSURE OF THE INVENTION

Problem to be Solved by the Invention

The present invention was made to solve the above-described problems of the conventional art. That is, the problem to be solved by the present invention is to provide a polyester resin excellent in various properties wherein the film formability is good, film fracture (hairs) and scraping (galling) are not easily generated in the drawing/ironing process when applied to a metal-sheet-coating polyester film, the film surface is not damaged when used as the inner-surface film for a metallic can, and the metallic can is hardly corroded (dent resistance), by dropping or external impact (denting), after a product is made by enclosing contents into the can.

Means to Solve the Problem

The present inventors have diligently studied to solve the above-described problems. As a result, the present inventors have found that a polyester resin obtained by randomly copolymerizing (A) low-molecular weight ester oligomer comprising mainly ethylene terephthalate and (B) polyester polyol having a specific molecular weight and derived from a dimer acid has good film formability, no fracture and scraping take place during the formation of a metallic can, and the dent resistance is also excellent when it is applied to metal-sheet-coating polyester film. Furthermore the present inventors have found that the laminated polyester film of a two-layer structure obtained by laminating (I) copolyester resin layer comprising mainly ethylene terephthalate having a specific amount of isophthalic acid component and (11) the above-described copolyester resin layer with a specific structure has excellent can-making and beverage flavor retention properties, in addition to the above-described various properties, when laminated polyester film-coated metal cans are prepared, thus leading to the completion of the present invention.

That is, the copolyester resin of the present invention is characterized by comprising, as the constituent units, 50 to 93 mass % of (A) ester oligomer with the number-average molecular weight of 700 or lower and consisting of a dicarboxylic acid unit (a1) containing 70 mole % or more of the terephthalic acid component and a diol unit (a2) containing 70 mole % or more of the ethylene glycol component; and 7 to 50 mass % of (B) polyester polyol with the number-average molecular weight of 1500 to 3000 and consisting of a hydrogenated dimer acid unit (b1) and a 1,4-butanediol unit (b2).

In addition, it is preferable that the intrinsic viscosity of the above-described copolyester resin is 0.7 to 0.9.

In addition, the metal-sheet-coating polyester film of the present invention is characterized in that the film is formed of the above-described copolyester resin alone or by mixing with other resins.

In addition, the metal can coated with the polyester film of the present invention is characterized in that the above-described metal-sheet-coating polyester film is coated on the inner surface and/or outer surface of the metallic can.

In addition, the production method of the copolyester resin of the present invention is characterized by comprising a process for obtaining (A) ester oligomer with the number-average molecular weight of 700 or lower by the polycondensation reaction of a dicarboxylic acid unit (a1) containing 70 mole % or more of the terephthalic acid component and a diol unit (a2) containing 70 mole % or more of the ethylene glycol component and the subsequent depolymerization reaction, and a process for obtaining a copolyester resin comprising 50 to 93 mass % of the ester oligomer (A) and 7 to 50 mass % of the polyester polyol (B) by the polycondensation reaction of the ester oligomer (A) obtained in the above process and (B) polyester polyol with the number-average molecular weight of 1500 to 3000 and consisting of a hydrogenated dimer acid unit (b1) and a 1,4-butanediol unit (b2).

In addition, the metal sheet-covering laminated polyester film of the present invention is characterized by having a two-layer structure obtained by laminating a resin layer containing (I) copolyester resin consisting of a dicarboxylic acid unit containing 85 to 97 mole % of the terephthalic acid component and 15 to 3 mole % of the isophthalic acid component and a diol unit containing 90 mole % or more of the ethylene glycol component, and a resin layer containing (II) copolyester resin comprising, as the constituent units, 50 to 93 mass % of (A) ester oligomer with the number-average molecular weight of 700 or lower and consisting of a dicarboxylic acid unit (a1) containing 70 mole % or more of the terephthalic acid component and a diol unit (a2) containing 70 mole % or more of the ethylene glycol component; and 7 to 50 mass % of (B) polyester polyol with the number-average molecular weight of 1500 to 3000 and consisting of a hydrogenated dimer acid unit (b1) and a 1,4-butanediol unit (b2). In addition, in the above-described laminated polyester film for coating a metal sheet, it is preferable that the thickness of the layer (I) is 4 to 20 μm and the thickness of the layer (II) is 4 to 20 μm.

In addition, the polyester film-coated metal sheet of the present invention is characterized in that the above-described laminated polyester film for coating a metal sheet is coated on the surface of the metal sheet in the order of layer (II) and layer (I) from the surface of the metal sheet.

In addition, a metal can coated with the polyester film of the present invention is characterized by being formed of the above-described polyester film-coated metal sheet.

Effect of the Invention

The copolyester resin of the present invention is excellent in various properties wherein the film formability is good, film fracture (hairs) and scraping (galling) are not easily generated in the drawing/ironing process when used as a metal-sheet-coating polyester film, the film surface is not damaged, as the inner-surface film for a metallic can, and the metallic can is hardly corroded (dent resistance), by dropping or external impact (denting), after a product is made by enclosing contents into a can. Furthermore, the laminated polyester film of a two-layer structure of the present invention has excellent can-making and beverage flavor retention properties, in addition to the above-described various properties, when laminated polyester film-coated metal cans are prepared.

BEST MODE FOR CARRYING OUT THE INVENTION

Hereinafter, the present invention will be explained in further detail.

Copolyester Resin

The copolyester resin of the present invention is characterized by comprising, as the constituent units, 50 to 93 mass % of (A) ester oligomer with the number-average molecular weight of 700 or lower and consisting of a dicarboxylic acid unit (a1) containing 70 mole % or more of the terephthalic acid component and a diol unit (a2) containing 70 mole % or more of the ethylene glycol component; and 7 to 50 mass % of (B) polyester polyol with the number-average molecular weight of 1500 to 3000 and consisting of a hydrogenated dimer acid unit (b1) and a 1,4-butanediol unit (b2).

Ester Oligomer (A)

In the ester oligomer (A) used in the present invention, the dicarboxylic acid unit (a1) contains 70 mole % or more of a terephthalic acid unit. The entire amount of the dicarboxylic acid unit can be the terephthalic acid unit. If the amount of the terephthalic acid unit is less than 70 mole %, hairs tend to be generated at the step of forming a metallic can. Dicarboxylic acid components other than terephthalic acid may be contained in the range of less than 30 mole % so far as the lamination properties to a metal sheet and the properties at the time of metallic can formation are not impaired. Examples include isophthalic acid, succinic acid, adipic acid, azelaic acid, sebacic acid, 1,4-naphthalenedicarboxylic acid, 4,4'-biphenyldicarboxylic acid, 1,12-dodecanedioic acid, 1,2-cyclohexanedicarboxylic acid, 1,3-cyclohexanedicarboxylic acid, 1,4-cyclohexanedicarboxylic acid, etc.; these may be used either alone or in combination of two or more. Among them, for example, isophthalic acid may be preferably used in the range of about 1 to 30 mole % from the viewpoint of improved dent resistance by the control of crystallinity of the copolyester resin.

The diol unit (a2) contains 70 mole % or more of an ethylene glycol unit. The entire amount of the diol unit can be the ethylene glycol unit. If the ethylene glycol unit is less than 70 mole %, when used as a film by blending with polyethylene terephthalate resin, for example, the compatibility is poor and the dent resistance may not be good. The diol component other than ethylene glycol may be contained in the range of less than 30 mole %. Examples include propylene glycol, butanediol, neopentyl glycol, diethylene glycol, cyclohexanedimethanol, etc., and these may be used either alone or in combination of two or more.

The number-average molecular weight of the ester oligomer (A) used in the present invention is 700 or lower and preferably 300 to 700. By carrying out copolymerization by using an ester oligomer (A) with the number-average molecular weight of 700 or lower, the polyester polyol (B) can be randomly bonded in the polymer chain, and a transparent copolyester resin can be obtained. Because the obtained copolyester resin has good compatibility with other resins, when the melt extrusion is carried out by blending it with other resins, the problem such as a surging phenomenon (discharge instability phenomenon) does not take place, and a film can be stably formed.

On the other hand, if an ester oligomer with the number-average molecular weight that exceeds 700, for example, that with about 1000 is used, the plateauing of polymerization reaction takes place in the subsequent copolymerization reaction with the polyester polyol (B). As a result, for example, a high-viscosity copolyester resin with an intrinsic viscosity of about 0.7 to 0.9 cannot be obtained. When a polyester whose number-average molecular weight exceeds 5000 is used, a high-molecular copolyester resin can be obtained without a plateauing phenomenon of the polymerization reaction. However, a -(A)-(B)-type block copolymer is formed because the molecular weight of the ester unit (A) of the obtained copolyester resin is large, and the appearance of the resin becomes cloudy because of phase separation. Furthermore, a surging phenomenon (discharge instability phenomenon) takes place in such a block copolymer because of poor compatibility with other resins, during melt extrusion, and there is a problem in that a sheet or film cannot be formed.

The ester oligomer (A) is obtained, according to a publicly known method, by the esterification reaction of a dicarboxylic acid component (a1), comprising mainly terephthalic acid; and a diol component (a2), comprising mainly ethylene glycol. Examples include the method to obtain the oligomer by the transesterification of the starting material, wherein methyl groups are attached at the terminals of the dicarboxylic acid component (a1), with the diol component (a2) by adding a catalyst; and the method to obtain the oligomer by the direct esterification reaction of the starting material, wherein the terminals of the dicarboxylic acid component (a1) are not modified, with the diol component (a2).

In the production of the ester oligomer (A), for example, after the designated esterification rate is reached at a reaction temperature of 230 to 250° C., 3 to 10 mass % of the diol (ethylene glycol) with respect to the obtained entire oligomer is loaded into the system, and a depolymerization reaction is carried out preferably for about 30 minutes to 1 hour by maintaining the internal temperature at 230 to 250° C. The number-average molecular weight of the ester oligomer (A) can be adjusted, after the esterification reaction, to 700 or lower by carrying out a depolymerization reaction with a diol (ethylene glycol). On the other hand, if the depolymerization reaction is not carried out, the number-average molecular weight of the ester oligomer becomes high exceeding 700 under the normal conditions. Alternatively, when a depolymerization reaction is not carried out, the number-average molecular weight can be controlled to 700 or lower by keeping the mole ratio of the diol component with respect to the dicarboxylic acid component to be in the high range of 1.25 to 1.60. If the mole ratio of the diol component is less than 1.25, the number-average molecular weight exceeds 700.

Polyester Polyol (B)

In the polyester polyol (B) used in the present invention, the dicarboxylic acid unit consists of a hydrogenated dimer acid unit (b1). The dimer acid is a dicarboxylic acid compound of 36 carbon atoms obtained by dimerizing an unsaturated fatty acid of 18 carbon atoms such as oleic acid or linoleic acid. A saturated dimer acid that is obtained by the hydrogenation of the remaining unsaturated double bonds, after dimerization, is a hydrogenated dimer acid. The dicarboxylic acid unit of the polyester polyol (B) consists of this hydrogenated dimer acid unit (b1). Normally, hydrogenated dimer acids are obtained as a mixture of linear/branched compounds and alicyclic compounds, and their contents are different depending upon the production process. In the present invention, their contents are not limited in particular. The diol unit of the polyester polyol (B) consists of a 1,4-butanediol unit (b2). The terminals of the polyester polyol (B) are all hydroxyl groups that are derived from the 1,4-butanediol unit (b2).

The number-average molecular weight of the polyester polyol (B) is 1500 to 3000, and preferably 1800 to 2500. If the average molecular weight is in this range, the reactivity during copolymerization is excellent, and the performance of the obtained copolyester resin as a metal sheet-covering film is excellent. On the other hand, if the average molecular weight is less than 1500, the reactivity during copolymerization is good. However, when the obtained copolyester resin is used as the protection film for the inner and outer surfaces of a metallic can, the dent resistance tends to be poor. On the other hand, if the average molecular weight exceeds 3000, the reactivity during copolymerization is poor, and a copolyester resin of the desired molecular weight may not be obtained.

The polyester polyol (B) can be obtained, according to a publicly known method, by the esterification reaction of a hydrogenated dimer acid unit (b1) and a 1,4-butanediol unit (b2). However, each mole ratio in the reaction is necessary to be adjusted so that the terminal will be hydroxyl groups. Alternatively, commercial products may be used as the polyester polyol (B). For example, as the polyester polyol with the number-average molecular weight of 2200 and consisting of a hydrogenated dimer acid and 1,4-butanediol, Priplast 3199 (manufactured by Croda) is commercially available. As other polyester polyol commercial products, Priplast 3162, 3192, 3196, 2101, 2104 (all of them are manufactured by Croda), etc. are available.

Copolymerized Polyester Resin

The copolyester resin of the present invention is obtained by the copolymerization reaction of 50 to 93 mass % of the ester oligomer (A) and 7 to 50 mass % of the polyester polyol (B). Here, the content of the polyester polyol (B) in the total polymer is 7 to 50 mass %, and preferably 15 to 35 mass %. If the content of the polyester polyol (B) is in the above range, the copolymerization reactivity is excellent and the dent resistance is particularly excellent when the obtained copolyester resin is used as the protection film for the inner and outer surfaces of a metallic can. In addition, because a copolyester resin wherein the polyester polyol (B) is randomly bonded in the polymer chain is obtained, the appearance is colorless/transparent or light yellow/transparent. On the other hand, if the content of the polyester polyol (B) is less than 7 mass %, the dent resistance is poor when used as the protection film for the inner and outer surfaces of a metallic can. If the content of the polyester polyol (B) exceeds 50 mass %, the copolymerization reactivity is poor, the phase separation of the polyester polyol (B) takes place in the obtained copolyester resin, and the appearance may become cloudy.

The copolymerization reaction of the ester oligomer (A) and the polyester polyol (B) can be carried out by a publicly known conventional method. For example, a series of reactions can be carried out under a high vacuum by gradually reducing the inside pressure of the reaction system, wherein the respective components are added, from the atmospheric pressure to 133.3 Pa or less. The reaction temperature is preferably controlled between 250 to 270° C. If the temperature exceeds 270° C., the lowering of viscosity takes place because of poor copolymerization reaction in the latter half. If the temperature is less than 250° C., the copolymerization reaction may not proceed. As the polymerization catalyst of the copolymerization reaction, antimony trioxide, germanium dioxide, titanium compounds, etc. can be used. Among them, it is preferable to use titanium compounds such as tetrabutyl titanate and titanium tetraisopropoxide from the standpoint of reactivity, safety, and cost. Furthermore, the intrinsic viscosity of the copolyester resin is not limited in particular, however, it is preferably 0.7 to 0.9 when used as the metal-sheet-coating polyester film.

In the copolyester resin of the present invention, metal salts such as magnesium acetate, calcium acetate, and magnesium chloride can be added to stabilize the electrostatic adhesion to the cooling roller when melt-extrusion film is formed. Furthermore, a suitable amount of inert particles such as silica, alumina, calcium carbonate, and titanium dioxide can be blended as the antiblocking agent for film rolls; the average particle size of inert particles is preferably 1.0 to 4.0 µm. If the size less than 1.0 µm, antiblocking is poor; if the size exceeds 4.0 µm, the detachment of particles by friction and the film fracture during film drawing may take place.

The copolyester resin of the present invention may contain additives such as heat stabilizers, antioxidants, UV absorbers, etc. as necessary. Examples of antioxidants include hindered-phenol antioxidants, phosphorus antioxidants, and sulfur antioxidants, and in particular, hindered-phenol antioxidants are preferable. These antioxidants may be added in the combination of several kinds thereof, and the content is preferably 100 to 5000 ppm.

The copolyester resin of the present invention can be used alone in forming a film; however, it is preferable to use it by blending with other polyester resins. In particular, when used as the protection film for the inner and outer surfaces of a metallic can, it is preferable to form a film by blending the copolyester resin of the present invention with other polyester resins such as polyethylene terephthalate resin, polyethylene terephthalate-isophthalate copolymerized resin, and modified-polyethylene terephthalate resins obtained by modifying with other third and fourth components. When it is blended with other polyester resins, the copolyester resin of the present invention is blended preferably in the range of 2 to 90 mass % of the total amount and more preferably in the range of 7 to 50 mass %.

Laminated Polyester Film

The metal sheet-covering laminated polyester film of the present invention is characterized by having a two-layer structure wherein the layer (I) containing a copolyester resin comprising mainly polyethylene terephthalate and the layer (II) containing a copolyester resin with the above-described specific structure are laminated.

Layer (I)

In the laminated polyester film of the present invention, the copolyester resin used for the layer (I) consists of a dicarboxylic acid unit comprising 85 to 97 mole % of the terephthalic acid component and 15 to 3 mole % of the isophthalic acid component and a diol unit comprising 90 mole % or more of the ethylene glycol component. That is, the layer (I) copolyester resin mainly comprises ethylene terephthalate and at least 3 to 15 mole % of the isophthalic acid component is copolymerized. Here, if the isophthalic acid component exceeds 15 mole %, the inner-surface film of the can adheres too much to the punch, which is a pressing tool, during can manufacturing. Thus, the phenomenon of stripping failure, wherein the inner and outer surfaces of the formed can are inverted when the punch is disengaged, is sometimes observed and it is undesirable. On the other hand, if the isophthalic acid component is less than 3 mole %, the film is not flexible and fine cracks are generated on the surface during the formation of a can body, resulting in the easy sorption of flavor components of the beverage, and it is not desirable.

In the layer (I) copolyester resin, dicarboxylic acid units other than the terephthalic acid component and isophthalic acid component may be contained so far as the lamination properties to a metal sheet and the metallic can properties are not impaired, for example in the range of 10 mole % or less. Examples of such dicarboxylic acid units include succinic acid, adipic acid, azelaic acid, sebacic acid, 1,4-naphthalene dicarboxylic acid, 4,4'-biphenyldicarboxylic acid, 1,12-dodecanedioic acid, 1,2-cyclohexanedicarboxylic acid, 1,3-cyclohexanedicarboxylic acid, and 1,4-cyclohexanedicarboxylic acid, and these may be used either alone or in combination of two or more.

In addition, in the layer (I) copolyester resin, diol units other than the ethylene glycol component may be contained in the range of 10 mole % or less. Examples of such diol units include aliphatic diols such as diethylene glycol, triethylene glycol, 1,2-propanediol, 1,3-propanediol, 1,5-pentanediol, 1,6-hexanediol, neopentyl glycol, polyethylene glycol, polypropylene glycol, and polytetramethylene glycol; and alicyclic diols such as 1,4-cyclohexanedimethanol and 1,4-cyclohexanediethanol, and these may be used either alone or in combination of two or more.

The layer (I) copolyester resin is obtained, according to a publicly known method, by the esterification reaction of the above-described dicarboxylic acid component and diol component. Examples include the method to transesterify the starting material, wherein methyl groups are attached at the terminals of the dicarboxylic acid component, with the diol component by adding a catalyst; and the method to directly esterify the starting material, wherein the terminals of the dicarboxylic acid component are not modified, with the diol component. Alternatively, commercial isophthalic acid-copolymerized polyethylene terephthalate resin may be used, and the examples of commercial products include IP121B, PIFG8, PIFG10 (all of them are manufactured by Bell Polyester Products, Inc.), etc. The intrinsic viscosity of the layer (I) copolyester resin is not limited in particular; however, it is preferably 0.7 to 0.9.

In the laminated polyester film of the present invention, the thickness of the layer (I) is not limited in particular; however, it is preferably at least 4 µm or higher and more preferably 4 to 20 µm. If the thickness of the layer (I) is less than 4 µm, crater-like holes are made on the layer (I) because of the melting effect of the layer (II) by the heat received in the can-making process and the smoothness appearance is poor. As a result, the detection capability of an inner-surface defect inspection machine is lowered, and the beverage flavor retention may be poor.

Layer (II)

In the laminated polyester film of the present invention, a copolyester resin used for the layer (II) is the above-described copolyester resin of the present invention; that is, the resin comprises, as the constituent units, 50 to 93 mass % of (A) ester oligomer with the number-average molecular weight of 700 or lower and consisting of a dicarboxylic acid unit (a1) containing 70 mole % or more of the terephthalic acid component and a diol unit (a2) containing 70 mole % or more of the ethylene glycol component; and 7 to 50 mass % of (B) polyester polyol with the number-average molecular weight of 1500 to 3000 and consisting of a hydrogenated dimer acid unit (b1) and a 1,4-butanediol unit (b2). The details of the ester oligomer (A) and polyester polyol (B), which are constituent units, and the preferable polymerization methods are explained above.

In the laminated polyester film of the present invention, the thickness of the layer (II) is not limited in particular; however, it is preferably 4 to 20 μm. If the thickness of the layer (II) is less than 4 μm, the improvement in dent resistance may not be satisfactory. On the other hand, even if the thickness of the layer (II) exceeds 20 μm, it is economically disadvantageous because the dent resistance cannot be improved any further.

In the layer (I) and layer (II) copolyester resins used in the present invention, metal salts such as magnesium acetate, calcium acetate, and magnesium chloride can be added to stabilize the electrostatic adhesion to the cooling roller when melt-extrusion film is formed. Furthermore, a suitable amount of inert particles such as silica, alumina, calcium carbonate, and titanium dioxide can be blended as the antiblocking agent for film rolls; the average particle size of inert particles is preferably 1.0 to 4.0 μm. If the size is less than 1.0 μm, antiblocking is poor; if the size exceeds 4.0 μm, the detachment of particles by friction and the film fracture during film drawing may take place.

In addition, the layer (I) and layer (II) copolyester resins used in the present invention may contain additives such as heat stabilizers, antioxidants, UV absorbers, etc. as necessary. Examples of antioxidants include hindered-phenol antioxidants, phosphorus antioxidants, and sulfur antioxidants, and in particular, hindered-phenol antioxidants are preferable. These antioxidants may be added in the combination of several kinds thereof, and the content is preferably 100 to 5000 ppm.

The laminated polyester film of the present invention is obtained, according to a publicly known method, by laminating the above-described respective copolyester resins for the layer (I) and layer (II). Examples include the method wherein the layer (I) copolyester resin and the layer (II) copolyester resin are loaded into individual extruders, respectively, and simultaneously coextruded from one die (co-extrusion lamination); and the method wherein while the film of the layer (I) (or layer (II)) produced in advance by a T-die method or inflation method is being sent out, the copolyester resin for the other layer (II) (or layer (I)) is simultaneously melt-extruded and solidified by cooling on the surface (extrusion lamination). The thickness of the laminated polyester film of the present invention is not limited in particular, however, the sum of the layer (I) and layer (II) is preferably 8 to 40 μm.

The laminated polyester film of the present invention is coated on the surface of the metal sheet in the order of layer (II) and layer (I) from the surface of the metal sheet. The type of metal sheet is not limited in particular, however, steel sheet, aluminum sheet, aluminum alloy sheet, etc. are used. Steel sheet is not limited by the sheet thickness and mechanical properties such as the tensile strength at break, and the steel sheet normally used for can making, more specifically, the steel sheet for drawn cans, drawn-ironed cans, and thinning deep-drawn cans is used. Similarly, aluminum sheet and aluminum alloy sheet are also not limited, in particular, by the sheet thickness and mechanical properties such as the tensile strength at break. Aluminum sheet normally used for can making, more specifically the aluminum sheet for drawn-ironed cans is used. Aluminum sheet and aluminum alloy sheet may be surface-treated, and those treated by phosphoric acid chromate treatment or other chemical conversion treatment can be applied.

Example 1

Hereinafter, the present invention will be more concretely explained by examples. However, the present invention is not limited by these examples. Various properties in the examples were evaluated by the below-described methods.

(1) Intrinsic Viscosity (Dl/g)

Each copolyester resin obtained in the examples and comparative examples was dissolved in the mixed solvent, phenol/tetrachloroethane=60/40 (weight ratio), and the solution viscosity was measured at 20° C. with an automatic viscosity measuring device (manufactured by SUN Electronic Industries Corporation, ALC-6C) mounted with a Ubbelohde viscometer.

(2) Appearance of Resins

The appearance of each copolyester resin obtained in the examples and test examples was determined visually.

(3) Glass Transition Temperature (Tg), Crystallization Temperature (Tc), and Melting Point (Tm)

Polyester resin composition (10 mg) was measured with a differential scanning calorimeter DSC (manufactured by PerkinElmer Co., DSC7) at a rate of temperature increase of 10° C./min.

(4) Film Formability

With a twin-screw extruder (manufactured by The Japan Steel Works, Ltd., TEX30α), 10 mass % of each copolyester resin obtained in the examples and comparative examples and 90 mass % of solid phase-polymerized isophthalic acid (10 mole %)-copolymerized polyethylene terephthalate resin (intrinsic viscosity: 0.75) were kneaded at 250° C. Then, the obtained kneaded resin was dried, and a single-layer sheet with a width of 350 mm and a thickness of 80 μm was formed with a sheet-forming machine equipped with short-axis extruders with ϕ35 mm and a T-die at 250° C. It was drawn to four times with a longitudinally uniaxial drawing machine at a surface temperature, at the drawing-roll section, of 85 to 100° C. The edge face was cut, and a uniaxially-stretched roll film (single layer) with a width of 190 mm and a thickness of 20 μm was collected. The film formability in a series of the above-described film-forming processes was evaluated for each copolyester resin.

(5) Generation of Hairs and Galls in the Manufacturing Process of Film-Coated Metal Cans From each of the thus obtained film-coated aluminum sheet, a cup was formed with a punch of ϕ66 mm so that the polyester film-covered face would be the inner surface. Then, trimming treatment was carried out by ironing with a three-stage die. Subsequently, amorphous treatment was carried out at 240° C. and it was naturally cooled without quenching. Then, flange processing at the neck section was carried out to obtain a two-piece can. When the film surface is damaged by ironing with dies in the above-described series of metallic can-making processes, the damage generated along the direction of formation is galls, and whisker-like film pieces generated on the face of the can edge are hairs. When each occurrence frequency was less than 5%, with respect to the total number of manufactured cans, it was evaluated to be "S", when it was 5 to less than 10%, it was evaluated to be "A", and when it was 10% or higher, it was evaluated to be "C"

(6) Dent Resistance of Film-Coated Metal Cans

Into the thus obtained each two-piece can, sports drink (Pocari Sweat: manufactured by Coca-Cola Company) was filled. Then, a lid was applied, and a slit-like dent was caused on the metallic can from the outside at 5° C. The can was stored at 55° C., and the corrosion state of the dented section was examined after 1 month and evaluated by the following criteria.

No corrosion: "S"

Corroded section is less than half (more than half of the dented section is not corroded): "A"

Slightly corroded (partially corroded over the entire region of the dented section): "B"

Totally corroded (the entire region of the dented section is completely corroded): "C"

The number-average molecular weight of the ester oligomer (A) was evaluated as follows.

(i) To 0.5 g of the ester oligomer, 25 mL of benzyl alcohol was added and it was heated. Then, 25 mL of diethylene glycol was added and heated further. After cooling, 25 mL of methyl alcohol and the indicator phenolphthalein were added. The titration was carried out with 0.1 N sodium hydroxide solution, and the acid value was determined by the following equation.

Acid value (mg KOH/g)=(A−B)*factor*5.61/sample weight

A: amount of titrant in a blank test B: amount of titrant in this test (ii) Deuterated chloroform/trifluoroacetic acid were used as the solvent, and H-NMR of the ester oligomer was measured. The mole ratio C of the ester oligomer was determined from the ratio of the integrated peaks due to ethylene glycol and those due to the acid component.

(iii) The number-average molecular weight was calculated by the following equation from the esterification rate Es and the mole ratio C of the ester oligomer. The esterification rate Es can be calculated by the conventional method based on the acid value.

Number-average molecular weight=192.2/(1+C−2*Es)

The present inventors produced copolymer polyester resins of the below-described examples and comparative examples and evaluated various properties by the above-described methods. The amounts of loaded raw materials for the respective copolyester resins of the examples and comparative examples and the evaluation results for the respective resins are summarized in Tables 1 to 3.

Example 1-1

The theoretical scale of the final copolyester resin product was set at 11 kg. Thus, 5.38 kg of bis(hydroxyethylene) terephthalate (BHET), 3.52 kg of terephthalic acid (TPA), and 0.5 kg of ethylene glycol were loaded into a 30 L autoclave equipped with a fractionating column. Under atmospheric pressure with nitrogen flow, the esterification reaction was carried out by increasing the internal temperature to 250° C. The designated amount of generated water by the reaction was removed by fractional distillation to the outside of the system, and the esterification reaction was carried out to the esterification rate of 95% or higher. Then, 0.66 kg of ethylene glycol was loaded into the system, and a depolymerization reaction was carried out at 250° C. for 30 minutes or longer by increasing the internal temperature, which has been decreasing. The number-average molecular weight of the obtained ester oligomer was 340. Then, 2.75 kg of the polyester polyol with the number-average molecular weight of 2200 (Priplast 3199: manufactured by Croda; acid value: 1 mg KOH/g) and consisting of a hydrogenated dimer acid and 1,4-butanediol was added into the system, and an additional esterification reaction with stirring was carried out for 30 minutes or longer. Subsequently, 60 ppm, in terms of elemental titanium, of titanium tetrabutoxide was added as the polycondensation catalyst. After stirring, the pressure was reduced to 13.3 kPa or lower in 1 hour. During this time, the internal temperature was increased from 250° C. to 265° C., and a copolymerization reaction with stirring was carried out to the designated viscosity under a high vacuum of 13.3 kPa or lower. The extrusion to a cord-like shape was carried out from the mouthpiece into water. Pellets of the copolymer resin were obtained by cutting with a pelletizer. The appearance of the obtained pellets was light yellow and transparent. The obtained copolyester resin was vacuum-dried at 70° C. for 12 hours or more, and it was kneaded with isophthalic acid (10 mole %)-copolymerized polyethylene terephthalate resin with the intrinsic viscosity of 0.75. Then, the formation of a single-layer film and the manufacturing of film-coated metal cans were carried out.

Example 1-2

The esterification reaction and copolymerization reaction were carried out similarly to Example 1-1 except that the amount of TPA was changed to 2.25 kg, the amount of isophthalic acid (IPA) was changed to 1.27 kg, and the content of isophthalic acid in the dicarboxylic acid component was set at 18 mole %; thus a copolyester resin was obtained. Similarly to Example 1-1, the formation of a single-layer film and the manufacturing of film-coated metal cans were carried out with the obtained copolyester resin.

Examples 1-3 to 1-6>

The esterification reaction and copolymerization reaction were carried out similarly to Example 1-1, except that the amount of the loaded polyester polyol consisting of a hydrogenated dimer acid and 1,4-butanediol was varied in the range of 7 to 50 mass %; thus a copolyester resin was obtained. Similarly to Example 1-1, the formation of a single-layer film and the manufacturing of film-coated metal cans were carried out with the obtained copolyester resin.

Comparative Examples 1-1 and 1-2

The esterification reaction and copolymerization reaction were carried out similarly to Example 1-1 except that the amount of the loaded polyester polyol consisting of a hydrogenated dimer acid and 1,4-butanediol was changed to 5 mass % and 55 mass %; thus a copolyester resin was obtained. Similarly to Example 1-1, the formation of sheet and film and the manufacturing of film-coated metal cans were carried out with the copolyester resin obtained in Comparative Example 1-1. The copolyester resin obtained in Comparative Example 1-2 stuck to the roller during film forming, and no film could be obtained.

Comparative Examples 1-3 and 1-4

Raw materials were loaded in the same way as Examples 1-4 and 1-5. No depolymerization reaction was carried out after the esterification reaction and the succeeding copolymerization reaction with a polyester polyol was carried out to obtain a copolyester resin. The number-average molecular weights of the ester oligomers were 710 and 740, respectively. Similarly to Example 1-1, the formation of a single-layer film and the manufacturing of film-coated metal cans were carried out with the obtained copolyester resin.

Comparative Example 1-5

Transesterification of 7.24 kg of dimethylterephthalic acid and 6.94 kg of 1,4-butanediol was carried out by adding 34 ppm, in terms of elemental titanium, of tetrabutyl titanate as the catalyst. Then, an additional esterification reaction was carried out after adding 1.54 kg (6.5 mole % with respect to the acid component) of the hydrogenated dimer acid (Pripol 1009: manufactured by Croda). Subsequently, a polycondensation reaction was carried out at 245° C., and a copolyester (PBT) resin was obtained. Similarly to Example 1-1, the formation of a single-layer film and the manufacturing of film-coated metal cans were carried out with the obtained copolyester resin.

Comparative Example 1-6

The esterification reaction and copolymerization reaction were carried out similarly to Example 1-1 except that 10 mole % of the hydrogenated dimer acid (Pripol 1009: manufactured by Croda) with respect to the acid component, instead of polyester polyol, was copolymerized, thus a copolyester resin was obtained. Similarly to Example 1-1, the formation of a single-layer film and the manufacturing of film-coated metal cans were carried out with the obtained copolyester resin.

Comparative Example 1-7

Transesterification of 7.74 kg of dimethylterephthalic acid and 4.86 kg of 1,4-butanediol was carried out at 230° C. by adding 34 ppm, in terms of elemental titanium, of tetrabutyl titanate as the catalyst. Then, 95 ppm, in terms of elemental titanium, of tetrabutyl titanate was added as the polycondensation catalyst, and the pressure inside the system was gradually decreased to 13.3 kPa in 1.5 hours. At the same time, the internal temperature was increased to 245° C.; thus a polycondensation reaction was carried out. The pressure inside of the system was once restored to atmospheric pressure after 60 minutes after the stirring power started to increase by the polycondensation reaction. After the addition of 1.5 kg of the polyester polyol with the average molecular weight of 2200 (Priplast 3199: manufactured by Croda), the pressure inside the system was reduced again and the polycondensation reaction was continued. The reaction was completed with the designated stirring power, and the copolyester (PBT) resin was obtained. Similarly to Example 1-1, the formation of a single-layer film and the manufacturing of film-coated metal cans were carried out with the obtained copolyester resin.

Comparative Examples 1-8 and 1-9

Raw materials were loaded in the same way as Examples 1-1 and 1-4, and a polycondensation reaction was carried out by adding a catalyst without carrying out a depolymerization reaction after the esterification reaction. When the melt viscosity became 80 Pa-s, the polyester polyol was added and the copolymerization reaction was carried out. The number-average molecular weights of the ester oligomers were 7600 and 5700, respectively. Similarly to Example 1-1, the formation of a sheet or film was attempted with the obtained copolyester resin; however, no film could be obtained because of the surging phenomenon (discharge instability phenomenon) during film formation.

Raw material compositions and various evaluation results for the copolyester resins of the above-described examples and comparative examples are summarized in Tables 1 to 3.

TABLE 1

|  | Example1-1 | Example1-2 | Example1-3 | Example1-4 | Example1-5 | Example1-6 |
|---|---|---|---|---|---|---|
| Ester oligomer(A) | PET (TPA100/ EG100) | PET-PEI (TPA82: IPA18/ EG100) | PET (TPA100/ EG100) | PET (TPA100/ EG100) | PET (TPA100/ EG100) | PET (TPA100/ EG100) |
| Ester oligomer(A) Number-average M.W. | 340 | 450 | 590 | 440 | 480 | 530 |
| Ester oligomer(A) Content(mass %) | 75 | 75 | 93 | 85 | 65 | 50 |
| Polyester polyol(B) | Priprast3199 (Croda) | Priprast3199 (Croda) | Priprast3199 (Croda) | Priprast3199 (Croda) | Priprast3199 (Croda) | Priprast3199 (Croda) |
| Polyester polyol(B) Number-average M.W. | 2200 | 2200 | 2200 | 2200 | 2200 | 2200 |
| Polyester polyol(B) Content(mass %) | 25 | 25 | 7 | 15 | 35 | 50 |
| Intrinsic viscosity(dl/g) | 0.742 | 0.711 | 0.705 | 0.726 | 0.771 | 0.795 |
| Resin appearance | Transparent | Transparent | Transparent | Transparent | Transparent | Transparent |
| Tg(° C.) | 31.4 | 25.1 | 50.3 | 39.7 | 15.0 | 1.4 |
| Tc(° C.) | 94.3 | — | 138.2 | 120.8 | 83.6 | 57.9 |
| Tm(° C.) | 213.3 | — | 243.1 | 230.6 | 191.0 | 162.2 |
| Film formability | Good | Good | Good | Good | Good | Good |
| Hair | S | S | S | S | S | S |
| Gall | S | S | S | A | A | A |
| Dent resistance | A | S | S | A | A | S |

TABLE 2

|  | Comparative example 1-1 | Comparative example 1-2 | Comparative example 1-3 | Comparative example 1-4 |
| --- | --- | --- | --- | --- |
| Ester oligomer(A) | PET (TPA100/EG100) | PET (TPA100/EG100) | PET (TPA100/EG100) | PET (TPA100/EG100) |
| Ester oligomer(A) Number-average M.W. | 410 | 440 | 740 | 710 |
| Ester oligomer(A) Content(mass %) | 95 | 45 | 65 | 85 |
| Polyester polyol(B) | Priprast3199 (Croda) | Priprast3199 (Croda) | Priprast3199 (Croda) | Priprast3199 (Croda) |
| Polyester polyol(B) Number-average M.W. | 2200 | 2200 | 2200 | 2200 |
| Polyester polyol(B) Content(mass %) | 5 | 55 | 35 | 15 |
| Intrinsic viscosity(dl/g) | 0.709 | 0.803 | 0.643 | 0.609 |
| Resin appearance | Transparent | Slight Cloudy | Transparent | Transparent |
| Tg(° C.) | 55.7 | −8.5 | 13.0 | 40.2 |
| Tc(° C.) | 143.8 | 46.4 | 80.7 | 118.7 |
| Tm(° C.) | 251.7 | 151.4 | 196.3 | 229.6 |
| Film formability | Good | Bad | Good | Good |
| Hair | S | — | A | A |
| Gall | A | — | A | A |
| Dent resistance | C | — | B | C |

TABLE 3

|  | Comparative example 1-5 | Comparative example 1-6 | Comparative example 1-7 | Comparative example 1-8 | Comparative example 1-9 |
| --- | --- | --- | --- | --- | --- |
| Ester oligomer | PBT (TPA100/ BDO100) | — | PBT (TPA100/ BDO100) | — | — |
| Ester oligomer Content(mass %) | — | — | 85 | — | — |
| Ester oligomer(A) | — | PET (TPA100/ EG100) | — | PET (TPA100/ EG100) | PET (TPA100/ EG100) |
| Ester oligomer(A) Number-average M.W. | — | 720 | — | 7600 | 5700 |
| Ester oligomer Content(mass %) | — | 90 | — | 85 | 75 |
| Hydrogenated dimer acid | Priprast1009 (Croda) | Priprast1009 (Croda) | — | — | — |
| Hydrogenated dimer acid Content(質量 %) | 6.5 | 10 | — | — | — |
| Polyester polyol(B) | — | — | Priprast3199 (Croda) | Priprast3199 (Croda) | Priprast3199 (Croda) |
| Polyester polyol(B) Number-average M.W. | — | — | 2200 | 2200 | 2200 |
| Polyester polyol(B) Content(mass %) | — | — | 15 | 15 | 25 |
| Resin appearance | Crystallization | Transparent | Cloudy | Cloudy | Cloudy |
| Tg(° C.) | ND | 29.9 | ND | 62.7 | 41.3 |
| Tc(° C.) | ND | 135.0 | ND | 121.0 | 97.9 |
| Tm(° C.) | 211.7 | 195.2 | 220.2 | 239.9 | 229.9 |
| Film formability | Good | Good | Good | Bad | Bad |
| Hair | C | C | A | — | — |
| Gall | C | C | C | — | — |
| Dent resistance | C | C | C | C | C |

As shown in Table 1 above, in the copolyester resins of Examples 1-1 to 1-6 (intrinsic viscosity: 0.705 to 0.785) obtained by the copolymerization reaction of 50 to 93 mass % of the PET ester oligomer (A) with the number-average molecular weight of 340 to 500; and 7 to 50 of the polyester polyol (B) with the number-average molecular weight (if 2200 and consisting of a hydrogenated dimer acid and 1,4-butanediol, the appearance of all of them were transparent, both the film formabtiity and film adhesion were excellent, the generation of hairs and galls was insignificant in the manufacturing process of film-coated metal cans, and the dent resistance of the film-coated, metal cans were very good.

On the other hand, as shown in Table 2 above, in the copolyester resin of Comparative Example 1-1, wherein the content of the polyester polyol (B) was 5 mass %, the dent resistance of the film-coated metal can was not sufficiently improved and was poor. In the copolyester resin of Comparative Example 1-2, wherein the content of the polyester polyol (B) was 55 mass %, the phase separation of the polyester polyol (B) took place and the appearance became cloudy and it stuck to the roller during film forming, and no film could be obtained.

In Comparative Examples 1-3 and 1-4, wherein no depolymerization reaction was carried out in the formation of the ester oligomer (A), the number-average molecular weights of the ester oligomers were 710 and 740, respectively. In the subsequent copolymerization reaction with the polyester polyol (B), the plateauing of the reaction took place, and the intrinsic viscosities of the obtained copolyester resins were low with 0.609 to 0.643. In addition, the dent resistance of the film-coated metal can that was produced by using this copolyester resin was not sufficiently improved.

As shown in Table 3 above, in both copolyester resin of Comparative Example 1-5, obtained by the copolymerization of a PBT ester oligomer and a hydrogenated dimer acid, and that of Comparative Example 1-6, obtained by the copolymerization of a PET ester oligomer similar to that of the present invention and a hydrogenated dimer acid, the results were poor in the generation of hairs and galls in the manufacturing process of film-coated metal cans and in the product dent resistance. In the copolyester resin, of Comparative Example 1-7, obtained by the copolymerization of a PBT ester oligomer and a polyester polyol (B) similar to that of the present invention, some improvement in the generation of hairs was made; however, satisfactory results could not be obtained in both the generation of galls and dent resistance. In both Comparative Examples 1-5 and 1-7, wherein the PBT ester oligomer was used, transparent copolyester resins could not be obtained.

Furthermore, in Comparative Examples 1-8 and 1-9, wherein no depolymerization reaction was carried out and the polycondensation reaction was carried out until the melt viscosity became 80 Pa·s in the formation of the ester oligomer (A), the number-average molecular weights of the ester oligomers were 7600 and 5700, respectively. The subsequent copolymerization reaction with polyester polyol (B) proceeded without difficulty; however, the appearance of the obtained copolyester resin was cloudy. In addition, a surging phenomenon (discharge instability phenomenon) took place during the melt extrusion in the film-forming process, and no sheet or film could be formed.

Example 2

Subsequently, the present inventors prepared a laminated polyester film for the coating of a metallic can by using the above-described copolyester resin and the copolyester resin comprising mainly polyethylene terephthalate, and the evaluation was carried out. Various evaluation methods used in the present example are shown below.

(1) Evaluation of the Formability in Each Process (Film-Forming Properties, Lamination Properties, and Can-Making Properties)

Isophthalic acid-copolymerized copolyester resin for the layer (I) was loaded to a short-axis extruder with φ35 mm and the copolyester resin for the layer (I) was loaded to another short-axis extruder with φ35 mm. The copolyester resins for the layer (I) and layer (II) were coextruded with a sheet-forming machine equipped with a T-die, and a two-layer sheet with a width of 350 mm and a thickness of 80 μm was formed at 250° C. On this occasion, if the resins come out from a T-die with pulsation, the thickness of the sheet becomes non-uniform; therefore, the film-forming properties in such a case was evaluated to be "C".

Subsequently, it was drawn to four times with a longitudinally uniaxial drawing machine at a surface temperature, at the drawing-roll section, of 85 to 100° C. The edge face was cut, and a uniaxially-stretched roll film with a width of 190 mm and a thickness of 20 μm was collected. Then, the lamination was carried out, so that the layer (II) would be on the aluminum sheet side, on both faces of the aluminum alloy sheet with a thickness of 0.28 mm, which had been treated with phosphoric acid chromate chemical conversion at 190° C. The film on the aluminum sheet was melted once at 240° C. and rolled up after cooling to 60° C. or lower. If bumping takes place when the film is heated and melted, the film surface becomes rough because of gas bubbles. Thus, the evaluation of the lamination properties for such a case was designated to be "C".

From the thus-obtained laminated sheet, a blank of φ143 was cut out, and a cup was formed with a punch of φ66 mm. Then, it was ironed with a three-stage die so that the wall thickness of the thin section of the can barrel was 0.105 mm, and trimming treatment was carried out so that the height of the can was 127 mm. Subsequently, printing/coating were performed and burnt in at 240° C., which is higher than the melting point of the film. At the same time, the inevitably generated orientation to the can-height direction, during the formation, was eliminated and it was naturally cooled without quenching. Then, neck processing and flange processing was carried out to obtain a two-piece can. If the film adhere on the inner surface of the punch, on the occasion of cup formation with a punch, the stripping phenomenon, wherein the inner and outer surfaces of the can are inverted when the punch is disengaged, takes place; the evaluation of can-making properties of such a case was designated to be "C". If the can formation was possible but the appearance was poor, the evaluation of can-making properties was designated to be "B"

(2) Evaluation of Hairs and Galling in the Manufacturing Process of Film-Coated Metal Cans When the film surface is damaged by ironing with dies during the above-described series of metallic can-making processes, a damage generated along the direction of formation is galling, and whisker-like film pieces generated on the face of the can edge are hairs. When each occurrence frequency was less than 5%, with respect to the total number of manufactured cans, it was evaluated to be "S", when it was 5 to less than 10%, it was evaluated to be "A", and when it was 10% or higher, it was evaluated to be "C".

(3) Dent Resistance of Film-Coated Metal Cans and Flavor Evaluation

Into the thus obtained each two-piece can, sports drink (Pocari Sweat: manufactured by Coca-Cola Company) was filled. Then, a lid was applied, and a slit-like dent was caused on the metallic can from the outside at 5° C. The can was stored at 55° C., and the corrosion state of the dented section was examined after 1 month and evaluated by the following criteria.

No corrosion: "S"

Corroded section is less than half (more than half of the dented section is not corroded): "A"

Slightly corroded (partially corroded over the entire region of the dented section): "B"

Totally corroded (the entire region of the dented section is completely corroded): "C"

Similarly, tea was filled into each two-piece can and stored at 38° C., and the flavor after 1 week was evaluated. If the product value was present, it was evaluated to be "A", if some problems were present, it was evaluated to be "B", and if the product value was determined to be absent, it was evaluated to be "C".

The present inventors produced laminated films of the below-described examples and comparative examples and evaluated various properties by the above-described methods. The resin compositions, thicknesses, etc. of the laminated films for the respective examples and comparative examples are shown in Tables 4 to 6, and the evaluation results are summarized in Tables 7 and 8.

Example 2-1

As the copolyester resin for the layer (I), isophthalic acid (10 mole %)-copolymerized polyethylene terephthalate resin (intrinsic viscosity: 0.75) was produced. In order to produce a copolyester resin for the layer (II), 5.38 kg of bis(hydroxyethylene) terephthalate (BHET), 3.52 kg of terephthalic acid (TPA), and 0.5 kg of ethylene glycol were loaded into a 30 L autoclave equipped with a fractionating column. Under atmospheric pressure with nitrogen flow, the esterification reaction was carried out by increasing the internal temperature to 250° C. The designated amount of generated water by the reaction was removed by fractional distillation to the outside of the system, and the esterification reaction was carried out to the esterification rate of 95% or higher. Then, 0.66 kg of ethylene glycol was loaded into the system, and a depolymerization reaction was carried out at 250° C. for 30 minutes or longer by increasing the internal temperature, which has been decreasing. The number-average molecular weight of the obtained ester oligomer was 340. Then, 2.75 kg of the polyester polyol with the number-average molecular weight of 2200 (Priplast 3199: manufactured by Croda; acid value: 1 mg KOH/g) and consisting of a hydrogenated dimer acid and 1,4-butanediol, was added into the system and an additional esterification reaction with stirring was carried out for 30 minutes or longer. Subsequently, 60 ppm, in terms of elemental titanium, of titanium tetrabutoxide was added as the polycondensation catalyst. After stirring, the pressure was reduced to 13.3 kPa or lower in 1 hour. During this time, the internal temperature was increased from 250° C. to 265° C., and a copolymerization reaction with stirring was carried out to the designated viscosity under a high vacuum of 13.3 kPa or lower. The extrusion to a cord-like shape was carried out from the mouthpiece into water. Pellets of the copolymer resin were obtained by cutting with a pelletizer. The appearance of the obtained pellets was light yellow and transparent. The copolyester resin for the layer (I) and the copolyester resin for the layer (II) were respectively loaded to short-axis extruders, and a sheet was prepared by the coextrusion with a sheet-forming machine equipped with a T-die. In addition, the vertical uniaxial stretching of the film was carried out; thus a two-layer film consisting of layer (I) with the thickness of 12 μm and layer (II) with the thickness of 8 μm was obtained. This film was laminated on the aluminum alloy sheet with a thickness of 0.28 mm, which had been treated by phosphoric acid chromate chemical conversion, and film-coated metal cans were manufactured by using the obtained film-coated aluminum sheet.

Example 2-2

The film formation and the manufacturing of film-coated metal cans were carried out similarly to Example 2-1 except that the polyester polyol consisting of a hydrogenated dimer acid and 1,4-butanediol (Priplast 3199) was added into the system so that the loaded amount was 50 mass % of the total layer (II) resin in the layer (II) copolyester resin of Example 2-1, and the additional esterification reaction was carried out.

Example 2-3

The film formation and the manufacturing of film-coated metal cans were carried out similarly to Example 2-1 except that the polyester polyol consisting of hydrogenated dimer acid and 1,4-butanediol (Priplast 3199) was added into the system so that the loaded amount was 7 mass % of the total layer (II) resin in the layer (II) copolyester resin of Example 2-1, and an additional esterification reaction was carried out.

Example 2-4

The film formation and the manufacturing of film-coated metal cans were carried out similarly to Example 2-1 except that the number-average molecular weight of the ester oligomer, consisting of terephthalic acid (TPA) and ethylene glycol (EG), was 690 in the layer (II) copolyester resin of Example 2-1.

Example 2-5

The film formation and the manufacturing of film-coated metal cans were carried out similarly to Example 2-1 except that the dicarboxylic acid component of the ester oligomer was changed to 82 mole % of terephthalic acid (TPA) and 18 mole % of isophthalic acid (IPA) in the layer (II) copolyester resin of Example 2-1.

Example 2-6

The film formation and the manufacturing of film-coated metal cans were carried out similarly to Example 2-1 except that the polyethylene terephthalate resin, wherein 5 mole % of isophthalic acid was copolymerized, (intrinsic viscosity: 0.71) was used as the layer (I) copolyester resin of Example 2-1.

Example 2-7

The film formation and the manufacturing of film-coated metal cans were carried out similarly to Example 2-1 except that the polyethylene terephthalate resin, wherein 15 mole % of isophthalic acid was copolymerized, (intrinsic viscosity: 0.76) was used as the layer (I) copolyester resin of Example 2-1.

Comparative Example 2-1

The film formation and the manufacturing of film-coated metal cans were carried out similarly to Example 2-1 except that the polyester polyol consisting of a hydrogenated dimer acid and 1,4-butanediol (Priplast 3199) was added into the system so that the loaded amount was 5 mass % of the total layer (II) resin in the layer (II) copolyester resin of Example 2-1, and the additional esterification reaction was carried out.

Comparative Example 2-2

Copolyester resins used for the layer (I) and layer (II) were identical to those of Comparative Example 2-1. However, the film was once allowed to be in a molten state in the can-making process, and a rapid cooling treatment was carried out by blowing wind at ordinary temperature and at a wind velocity of 20 m/min, and film-coated metal cans were manufactured.

Comparative Example 2-3

The film formation and the manufacturing of film-coated metal cans were carried out similarly to Example 2-1 except that the polyester polyol consisting of a hydrogenated dimer acid and 1,4-butanediol (Priplast 3199) was added into the system so that the loaded amount was 55 mass % of the total layer (II) resin in the layer (II) copolyester resin of Example 2-1, and the additional esterification reaction was carried out.

Comparative Example 2-4

The film formation and the manufacturing of film-coated metal cans were carried out similarly to Example 2-1 except that no depolymerization reaction was carried out after the esterification reaction of terephthalic acid (TPA) and ethylene glycol (EG), in the layer (II) copolyester resin of Example 2-1, and the copolymerization reaction of the ester oligomer, whose number-average molecular weight was 720, and the polyester polyol was carried out subsequently.

Comparative Example 2-5

The film formation and the manufacturing of film-coated metal cans were carried out similarly to Example 2-1 except that no polyester polyol was used in the layer (II) copolyester resin of Example 2-1, and the transesterification of terephthalic acid (TPA) and 1,4-butanediol (1,4-BD) was carried out by adding 34 ppm, in terms of elemental titanium, of tetrabutyl titanate as the catalyst; an esterification reaction was carried out after adding 6.5 mole % of hydrogenated dimer acid (Pripol 1009, manufactured by Croda) with respect to the total amount of the dicarboxylic acid, and the polycondensation reaction was subsequently carried out at 245° C. to obtain hydrogenated dimer acid-modified polybutylene terephthalate-modified resin.

Comparative Example 2-6

The film formation and the manufacturing of film-coated metal cans were carried out similarly to Example 2-1 except that no polyester polyol was used in the layer (II) copolyester resin of Example 2-1, and the copolymerization reaction with 10 mole % of hydrogenated dimer acid (Pripol 1009, manufactured by Croda) with respect to the total amount of the dicarboxylic acid was carried out to obtain hydrogenated dimer acid-modified polyethylene terephthalate-modified resin.

Comparative Example 2-7

The film formation and the manufacturing of film-coated metal cans were carried out similarly to Example 2-1 except that the butylene terephthalate oligomer consisting of terephthalic acid (TPA) and 1,4-butanediol (1,4-BD) was used in the layer (II) copolyester resin of Example 2-1 without using ethylene glycol as the diol component of the ester oligomer.

Comparative Example 2-8

The film formation and the manufacturing of film-coated metal cans were carried out similarly to Example 2-1 except that the dicarboxylic acid component of the ester oligomer was changed to 65 mole % of terephthalic acid (TPA) and 35 mole % of isophthalic acid (IPA) in the layer (ii) copolyester resin of Example 2-1.

Comparative Example 2-9

The film formation and the manufacturing of film-coated metal cans were carried out similarly to Example 2-1 except that the polyethylene terephthalate resin, wherein 20 mole % of isophthalic acid was copolymerized (intrinsic viscosity: 0.71), was used in the layer (I) copolyester resin of Example 2-1.

Comparative Example 2-10

The film formation and the manufacturing of film-coated metal cans were carried out similarly to Example 2-1 except that the polyethylene terephthalate resin, wherein 2 mole % of isophthalic acid was copolymerized (intrinsic viscosity: 0.76), was used in the layer (I) copolyester resin of Example 2-1.

Comparative Example 2-11

The film formation and the manufacturing of film-coated metal cans were carried out similarly to Example 2-1 except that the thickness of layer (I) in Example 2-1 was allowed to be 3 µm (the total thickness of the laminated film was 20 µm).

Comparative Example 2-12

The film formation and the manufacturing of film-coated metal cans were carried out similarly to Example 2-1 except that the thickness of layer (II) in Example 2-1 was allowed to be 3 µm (the total thickness of the laminated film was 20 µm).

TABLE 4

| | (A)layer | | | | (B)layer | | | | | | Cooling |
|---|---|---|---|---|---|---|---|---|---|---|---|
| | Resin Composition | | | Thick- | Resin Composition | | | | | Thick- | method in |
| | | | | | Ester oligomer | | Polyester polyol | | | | |
| | TPA (Mol %) | IPA (Mol %) | EG (Mol %) | ness (µm) | Components (M.W.) | Mass % | Product name (M.W.) | Mass % | Intrinsic viscosity | ness (µm) | manufac-turing |
| Example2-1 | 90 | 10 | 100 | 12 | PET: IPA100/EG100 (Mn = 340) | 80 | Priplast3199 (Mn = 2200) | 20 | 0.73 | 8 | Naturally Cooled |

TABLE 4-continued

| | (A)layer | | | | (B)layer | | | | | Cooling method in manufacturing |
|---|---|---|---|---|---|---|---|---|---|---|
| | Resin Composition | | | Thickness (μm) | Resin Composition | | | | Intrinsic viscosity | Thickness (μm) |
| | | | | | Ester oligomer | | Polyester polyol | | | |
| | TPA (Mol %) | IPA (Mol %) | EG (Mol %) | | Components (M.W.) | Mass % | Product name (M.W.) | Mass % | | | |
| Example2-2 | 90 | 10 | 100 | 12 | PET: TPA100/EG100 (Mn = 480) | 50 | Priplast3199 (Mn = 2200) | 50 | 0.73 | 8 | Naturally Cooled |
| Example2-3 | 90 | 10 | 100 | 12 | PET: TPA100/EG100 (Mn = 590) | 93 | Priplast3199 (Mn = 2200) | 7 | 0.73 | 8 | Naturally Cooled |
| Example2-4 | 90 | 10 | 100 | 12 | PET: TPA100/EG100 (Mn = 690) | 80 | Priplast3199 (Mn = 2200) | 20 | 0.73 | 8 | Naturally Cooled |
| Example2-5 | 90 | 10 | 100 | 12 | PET-PEI: TPA82, IPA18/EG100 (Mn = 340) | 80 | Priplast3199 (Mn = 2200) | 20 | 0.73 | 8 | Naturally Cooled |
| Example2-6 | 95 | 5 | 100 | 12 | PET: IPA100/EG100 (Mn = 340) | 80 | Priplast3199 (Mn = 2200) | 20 | 0.73 | 8 | Naturally Cooled |
| Example2-7 | 85 | 15 | 100 | 12 | PET: IPA100/EG100 (Mn = 340) | 80 | Priplast3199 (Mn = 2200) | 20 | 0.73 | 8 | Naturally Cooled |

TABLE 5

| | (A)layer | | | | (B)layer | | | | | Cooling method in manufacturing |
|---|---|---|---|---|---|---|---|---|---|---|
| | Resin Composition | | | Thickness (μm) | Resin Composition | | | | Intrinsic viscosity | Thickness (μm) |
| | | | | | Ester oligomer | | Polyester polyol | | | |
| | TPA (Mol %) | IPA (Mol %) | EG (Mol %) | | Components (M.W.) | Mass % | Product name (M.W.) | Mass % | | | |
| Comparative Example 2-1 | 90 | 10 | 100 | 12 | PET: TPA100/EG100 (Mn = 360) | 95 | Priplast3199 (Mn = 2200) | 5 | 0.75 | 8 | Naturally Cooled |
| Comparative Example2-2 | 90 | 10 | 100 | 12 | PET: TPA100/EG100 (Mn = 360) | 95 | Priplast3199 (Mn = 2200) | 5 | 0.75 | 8 | Quenched |
| Comparative Example2-3 | 90 | 10 | 100 | 12 | PET: TPA100/EG100 (Mn = 410) | 45 | Priplast3199 (Mn = 2200) | 55 | 0.77 | 8 | — |
| Comparative Example2-4 | 90 | 10 | 100 | 12 | PET: TPA100/EG100 (Mn = 740) | 80 | Priplast3199 (Mn = 2200) | 20 | 0.64 | 8 | — |
| Comparative Example2-5 | 90 | 10 | 100 | 12 | IPA (Mol %) 93.5 | Hydrogenated dimer acid Pripol1009 (Mol %) 6.5 | EG (Mol %) — | 1,4-BD (Mol %) 100 | 0.78 | 8 | Naturally Cooled |
| Comparative Example2-6 | 90 | 10 | 100 | 12 | TPA (Mol %) 90 | Hydrogenated dimer acid Pripol1009 (Mol %) 10 | EG (Mol %) 100 | 1,4-BD (Mol %) — | 0.73 | 8 | Naturally Cooled |

TABLE 6

| | (A)layer | | | | (B)layer | | | | | | Cooling |
| | Resin Composition | | | Thickness (μm) | Resin Composition | | | | | Thickness (μm) | method in manufacturing |
| | | | | | Ester oligomer | | Polyester polyol | | | | |
| | TPA (Mol %) | IPA (Mol %) | EG (Mol %) | | Components (M.W.) | Mass % | Product name (M.W.) | Mass % | Intrinsic viscosity | | |
|---|---|---|---|---|---|---|---|---|---|---|---|
| Comparative Example2-7 | 90 | 10 | 100 | 12 | (PET: TPA100/ 1,4-BD100 | 85 | Priplast3199 (Mn = 2200) | 15 | 0.73 | 8 | Naturally Cooled |
| Comparative Example2-8 | 90 | 10 | 100 | 12 | PET-PEI: TPA65, IPA35/ EG100 (Mn = 340) | 80 | Priplast3199 (Mn = 2200) | 20 | 0.71 | 8 | Naturally Cooled |
| Comparative Example2-9 | 80 | 20 | 100 | 12 | PET: TPA100/ EG100 (Mn = 340) | 80 | Priplast3199 (Mn = 2200) | 20 | 0.73 | 8 | Naturally Cooled |
| Comparative Example2-10 | 98 | 2 | 100 | 12 | PET: TPA100/ EG100 (Mn = 340) | 80 | Priplast3199 (Mn = 2200) | 20 | 0.73 | 8 | Naturally Cooled |
| Comparative Example2-11 | 90 | 10 | 100 | 9 | PET: IPA100/ EG100 (Mn = 340) | 80 | Priplast3199 (Mn = 2200) | 20 | 0.73 | 17 | Naturally Cooled |
| Comparative Example2-12 | 90 | 10 | 100 | 17 | PET: TPA100/ EG100 (Mn = 340) | 80 | Priplast3199 (Mn = 2200) | 20 | 0.73 | 3 | Naturally Cooled |

TABLE 7

| | Evaluation | | | | | | |
| | Film formability | Lamination property | Can-making property | Hair | Gall | Dent resistance | Flavor |
|---|---|---|---|---|---|---|---|
| Example2-1 | A | A | A | A | A | A | A |
| Example2-2 | A | A | A | A | A | A | A |
| Example2-3 | A | A | A | A | A | A | A |
| Example2-4 | A | A | A | A | A | A | A |
| Example2-5 | A | A | A | A | A | A | A |
| Example2-6 | A | A | A | A | A | A | A |
| Example2-7 | A | A | A | A | A | A | A |

TABLE 8

| | Evaluation | | | | | | |
| | Film formability | Lamination property | Can-making property | Hair | Gall | Dent resistance | Flavor |
|---|---|---|---|---|---|---|---|
| Comparative example2-1 | A | A | A | A | B | C | A |
| Comparative example2-2 | A | A | A | A | A | A | A |
| Comparative example2-3 | C | — | — | — | — | — | — |
| Comparative example2-4 | C | — | — | — | — | — | — |
| Comparative example2-5 | A | A | A | C | C | C | A |
| Comparative example2-6 | A | A | A | C | C | C | A |
| Comparative example2-7 | A | A | A | C | C | C | A |
| Comparative example2-8 | A | A | A | C | A | B | A |
| Comparative example2-9 | A | A | C | — | — | — | — |

TABLE 8-continued

| | Evaluation | | | | | | |
|---|---|---|---|---|---|---|---|
| | Film formability | Lamination property | Can-making property | Hair | Gall | Dent resistance | Flavor |
| Comparative example2-10 | A | A | A | A | A | A | C |
| Comparative example2-11 | A | A | B | A | A | A | B |
| Comparative example2-12 | A | A | A | A | A | C | A |

As shown in Table 7 above, in the laminated polyester films of Examples 2-1 to 2-6, wherein the polyethylene terephthalate resin, in which 5 to 15 mole % of isophthalic acid was copolymerized, was used as the layer (I), and the polyester resin obtained by the copolymerization reaction of 50 to 93 mass % of the PET ester oligomer, with the number-average molecular weight of 340 to 690, and 7 to 50 mass % of the polyester polyol consisting of a hydrogenated dimer acid and 1,4-butanediol, was used as the layer (II), the film-forming properties, lamination properties, and can-making properties were all excellent, the generation of hairs and galls in the manufacturing process of film-coated metal cans was insignificant, and the dent resistance of post-formation metallic cans and the retention of the content flavor were very good.

On the other hand, as shown in Table 8 above, in Comparative Example 2-1 wherein the copolymerization ratio of the polyester polyol was 5 mass % in the layer (II) copolyester resin, some galling took place and the dent resistance was poor. As shown in Comparative Example 2-2, when quenching was carried out, the resin crystallization with cooling was suppressed, and the improvement in galling and dent resistance was observed; however, the process becomes complicated and the equipment cost is necessary. On the other hand, in Comparative Example 2-3, wherein the copolymerization ratio of the polyester polyol was 55 mass %, a phase separation of the polyester polyol took place, it stuck to the roller during film forming, and no film could be obtained.

In Comparative Example 2-4, wherein no depolymerization reaction was carried out in the formation of the ester oligomer of the layer (II) copolyester resin, the number-average molecular weight of the ester oligomer was 720. In the subsequent copolymerization reaction with the polyester polyol, the plateauing of the reaction took place, and the intrinsic viscosity of the obtained copolyester resin was low with 0.64. As a result, the stable film formation could not be carried out. In Comparative Example 2-5, wherein the copolyester resin was obtained by the copolymerization of terephthalic acid/1,4-butanediol with a hydrogenated dimer acid, and in Comparative Example 2-6, wherein the copolyester resin was obtained by the copolymerization of the PET ester oligomer, similar to that of the present invention, and a hydrogenated dimer acid, the results for both were poor in the generation of hairs and galls in the manufacturing process of film-coated metal cans and in the product dent resistance.

In Comparative Example 2-7, wherein the copolyester resin was obtained by the copolymerization of the PBT ester oligomer and the polyester polyol, similar to that of the present invention; satisfactory results could not be obtained in the generation of hairs and galls and the dent resistance. In Comparative Example 2-8, wherein the ethylene terephthalate oligomer, in which 35 mole % of isophthalic acid was copolymerized, was used as the ester oligomer; hairs were generated and the dent resistance was also somewhat poor.

In Comparative Example 2-9, wherein the polyethylene terephthalate, in which 20 mole % of isophthalic acid was copolymerized, was used as the layer (I) copolyester resin; the inner-surface film of the can adhered too much to the punch, which is a pressing tool, during can manufacturing, the phenomenon of stripping failure, wherein the inner and outer surfaces of the can are inverted when the punch is disengaged, took place and no two-piece can could be obtained. On the other hand, in Comparative Example 2-10, wherein the polyethylene terephthalate, in which 2 mole % of isophthalic acid was copolymerized, was used; fine cracks were generated on the surface during can manufacturing, resulting in the easy sorption of flavor components of beverages.

Furthermore, in Comparative Example 2-11, wherein the thickness of the layer (I) copolyester resin was allowed to be 3 μm, roughness was generated on the surface of the can, the appearance was poor, and flavor retention also tended to be somewhat poor. On the other hand, in Comparative Example 2-12, wherein the thickness of layer (II) copolyester resin was allowed to be 3 μm, the dent resistance could not be sufficiently improved.

The invention claimed is:

1. A method of producing a copolyester resin comprising:
   obtaining an ester oligomer (A) having a number-average molecular weight of 700 or lower by esterifying or transesterifying a dicarboxylic acid unit (a1) containing 70 mole % or more of terephthalic acid and a diol unit (a2) containing 70 mole % or more of ethylene glycol and then subsequently depolymerizing the reaction product of said esterification or transesterification reaction to form said ester oligomer (A) having the number-average molecular weight of 700 or lower;
   and then, copolymerizing 50 to 93 mass % of the ester oligomer (A) and 7 to 50 mass % of a polyester polyol (B) by a polycondensation reaction to form the copolyester resin, where polyester polyol (B) has a number-average molecular weight of 1,500 to 3,000 and is formed from a hydrogenated dimer acid (b1) and 1,4-butanediol (b2).

* * * * *